United States Patent [19]
Anderson

[11] Patent Number: 5,560,145
[45] Date of Patent: Oct. 1, 1996

[54] FISHING TACKLE SYSTEM

[76] Inventor: Dennis L. Anderson, 2544 N. 7th St., Phoenix, Ariz. 85006

[21] Appl. No.: 230,975

[22] Filed: Apr. 21, 1994

[51] Int. Cl.$^6$ .................................................. A01K 97/00
[52] U.S. Cl. ....................................... 43/54.1; 403/373
[58] Field of Search ..................... 248/289.1, 286; 297/188.08, 188.21; 403/337, 373, 362, 110; 43/54.1, 55, 57.1; 224/920

[56] References Cited

U.S. PATENT DOCUMENTS

| | | | |
|---|---|---|---|
| 486,804 | 11/1892 | Wood | 248/286 |
| 910,189 | 1/1909 | Fox | 248/299 |
| 1,165,500 | 12/1915 | Green | 403/362 |
| 1,931,020 | 10/1933 | Clark | 248/286 |
| 2,151,877 | 3/1939 | Walker | 248/286 |
| 2,697,975 | 12/1954 | Buhr | 403/110 |
| 2,708,147 | 5/1955 | Duggan | 220/481 |
| 3,063,751 | 11/1962 | Hatch | 248/286 |
| 4,080,080 | 3/1978 | Cisler | 403/110 |
| 4,756,412 | 7/1988 | Graves | 206/315.11 |
| 4,887,379 | 12/1989 | Harrison | 43/54.1 |
| 5,000,412 | 3/1991 | Sheehan | 248/286 |
| 5,289,940 | 3/1994 | Wisenbaugh | 43/57.1 |

FOREIGN PATENT DOCUMENTS

| | | | |
|---|---|---|---|
| 0538885 | 4/1957 | Canada | 297/188.21 |
| 2200021 | 7/1988 | United Kingdom | 43/54.1 |

*Primary Examiner*—Jack W. Lavinder
*Assistant Examiner*—James Miner
*Attorney, Agent, or Firm*—Parsons & Associates; Don J. Flickinger; Robert A. Parsons

[57] ABSTRACT

A fishing tackle system adapted to attach to a seat bottom. The fishing tackle system includes a fishing tackle box and a member coupling the fishing tackle box to the seat bottom. The fishing tackle system desirably includes a removable tray adapted to individually contain fishing lures in compartments integral to the removable tray. The fishing tackle system also desirably includes a beverage container receptacle adapted to accommodate a beverage can or bottle in a substantially upright position.

6 Claims, 3 Drawing Sheets

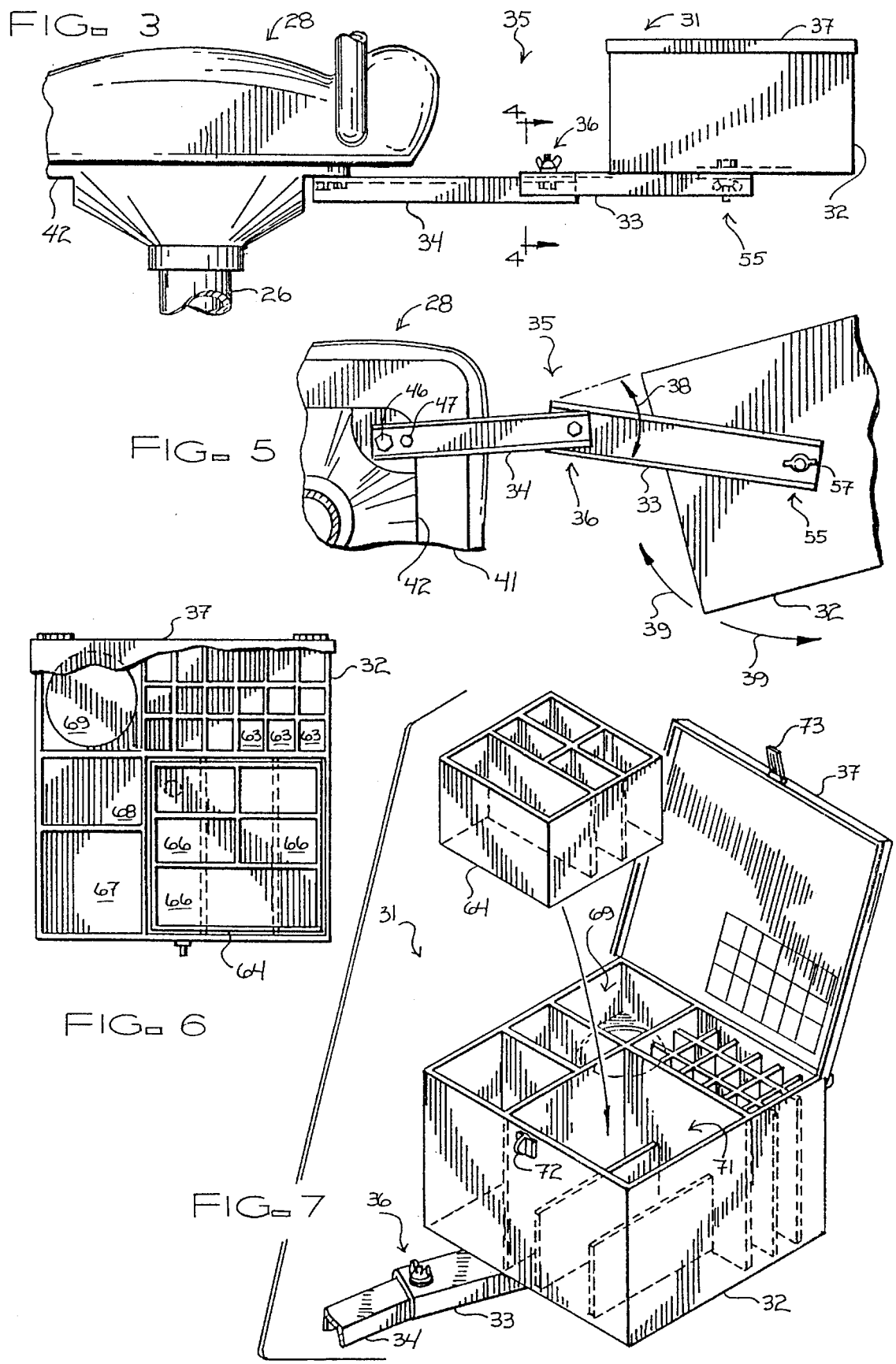

FISHING TACKLE SYSTEM

BACKGROUND OF THE INVENTION

1. Field of the Invention

This invention generally relates to angling apparatus generally intended for employment in the context of a fishing boat.

More particularly, the present invention relates to boat-borne fishing tackle boxes providing improved access to the contents thereof.

In a further and more specific aspect, the instant invention concerns a method and apparatus for providing a new and improved fishing tackle system having utility in fishing boats that include seating.

2. Prior Art

Fishing tackle boxes, fishing creels and specialized garments of great variety in construction and purpose are often usefully employed as angling accessories in many parts of the world. Some such devices require the sacrifice of one or more of the desirable features which fishing tackle boxes offer in order to fulfill the purpose(s) of these devices.

Fishing tackle boxes are generally desirable because they provide one or more advantages such as easy access to a variety of lures and because they may facilitate ready replacement of lost lures. However, fishing tackle boxes also may at times present disadvantages such as size or weight, or, when employed in fishing boats, inaccessibility of the contents of the fishing tackle box or obstruction of the angler at critical moments.

Fishing tackle boxes also tend to be vulnerable to being thrown about or even falling overboard when the boat is moving rapidly between desirable fishing loci or when being trailered to and from lakes and/or streams. Fishing tackle boxes also may be difficult to access from a seat or while actively fishing.

This is especially true in the context of bass boats and similar fishing boats. Bass boats typically incorporate one or more raised, adjustable seats. These adjustable seats are usefully employed in order to grant the angler visibility into the water by increasing the angle of the fisherman's gaze into the water. These adjustable seats also provide improved casting posture for facilitating access to underwater structure(s) likely to harbor fish. Various fishing tackle system adaptations have been devised to address one or more of these deficiencies.

Different types of fishing tackle boxes and related gear each provide one or more benefits to remedy these shortcomings but this equipment also typically compromises at least one of the desirable features which fishing tackle boxes offer.

For example, palm- or pocket-sized fishing tackle systems allow the angler to maintain a limited collection of lures readily to hand and largely obviate the risk(s) of inadvertently stepping on, kicking or tripping over the fishing tackle box. However, such systems only allow storage of, and access to, a limited collection of gear or selection of lures or hooks. Further, such systems do not accommodate bulkier items gracefully. These systems do have the advantages of (i) avoiding bending over in order to extract a lure and also (ii) accommodating changes in the elevation of the seat in those boats that employ adjustable seats.

Another approach involves placing a larger fishing tackle box on the floor or deck of the boat and moving the fishing tackle box whenever needed in order to accommodate changes in angling posture (e.g., switching sides). Disadvantages of this approach include (i) the inconvenience of bending over to reach the fishing tackle box, (ii) having to move the fishing tackle box whenever the angler elects to alter his position, (iii) the risks of stepping on or into or of tripping over the fishing tackle box in the heat of the hunt and also (iv) the need to stow the fishing tackle box whenever the boat is engaged in moving rapidly, typically encountered when moving from one part of a lake or other body of water to another part thereof.

Accordingly, it is often desirable to provide both a garment and fishing tackle storage in a single unit, preferably without compromise of the angler's reach or range of motion. Specially designed fishing vests, for example, may provide at least some of these desirable features and advantages, through pockets and also areas where lures may be hooked for stowage. Stowing lures on a hat also provides storage for, and access to, a limited number of lures without restricting motion of the angler's hands. Neither of these approaches adequately protects the angler from hooking himself or herself or provides any ability to accommodate additional gear or other supplies (e.g., a beverage container).

A problem which has been encountered with such approaches is a tendency for vests, hats etc. to represent at least some compromise or loss of aesthetic appeal and to provide only extremely limited storage capacity. These further fail to adequately protect the angler from becoming hooked by the fishing equipment.

Often, fishing tackle boxes are provided with generously-sized interiors and interchangeable trays. However, when these are employed, they require a storage capability for the unused trays. Both the fishing tackle box and the extra storage occupy floor, deck or storage space in the boat and represent a hazard when moving about, particularly in the presence of distractions (i.e., when landing a fish). Further, while representing substantial storage space, they do not offer any improvement in accessibility to the contents thereof, particularly for a fisherman occupying a raised seat, for example.

Moreover, while such fishing tackle boxes may provide generous tackle-carrying capacity, they are poorly adapted to holding a beverage container or other convenient ancillary amenities associated with angling (e.g., sunscreen). These ancillary amenities may be relatively bulky and/or heavy.

Accordingly, it is desirable to provide an improved capacity for storing fishing tackle together with other ancillary materials desirably included when fishing from a seat in a boat.

While the various mentioned prior art devices function as apparatus for providing storage of fishing gear, none provide satisfactory performance combined with all of the desirable features noted hereinabove.

It would be highly advantageous, therefore, to remedy the foregoing and other deficiencies inherent in the prior art. What is needed is an apparatus and accompanying method for maintaining lures, jigs, pliers, spare fishing line and other angling essentials together with associated apparatus conveniently at hand (and not underfoot) and accessible in a fashion compatible with the position and motion of the angler as he pursues his quarry.

Accordingly, it is an object of the present invention to provide improvements in fishing tackle boxes for use in conjunction with fishing boats.

Another object of the present invention is the provision of an improved, boat-compatible fishing tackle box including a beverage holder.

And another object of the present invention is the provision of an improved fishing tackle box that is readily accessible and that is intended for deployment in a fishing boat.

Still another object of the present invention is to provide an improved fishing tackle box that automatically tracks the motion of a fisherman who is seated in a fishing boat.

Yet another object of the instant invention is to provide a bass boat having seats that automatically adjust the heighth of a fishing tackle box when the seat is adjusted.

Yet still another object of the instant invention is the provision of a fishing tackle box for a fishing boat that does not require stowage when the boat is travelling at speed or in rough water.

And a further object of the invention is to provide a fishing tackle box featuring a removable and interchangeable portion.

Still a further object of the immediate invention is the provision of a boat-borne fishing tackle box that does not compromise the aesthetic appearance of the boat to which it is affixed.

Yet a further object of the invention is to provide a fishing tackle box adapted to be adjustably attached to the seat of a bass boat.

And still a further object of the invention is the provision of means whereby a fishing tackle box can be held in a level position regardless of the contour of a boat or other supporting surface.

And yet a further object of this invention is to provide a fishing tackle box which is readily attachable to a selected support member, such as the gunnel of a boat or leg of a chair.

And still a further object of the invention is the provision of method and apparatus, according to the foregoing, which is intended to allow ready and convenient access to a fishing tackle box when desired.

SUMMARY OF THE INVENTION

Briefly, to achieve the desired objects of the instant invention in accordance with a preferred embodiment thereof, provided is a fishing tackle system adapted to a fishing boat. The fishing tackle system includes a fishing tackle box and a member coupling the fishing tackle box to the fishing boat.

The fishing tackle system adapted to a fishing boat desirably but not essentially includes a beverage receptacle adapted to accommodate a can or bottle in a substantially upright position.

The member desirably but not essentially includes an adjustable member including a releasable locking capability for locking the adjustable member in a desired configuration.

The adjustable member desirably includes a first member adapted to be secured to a boat seat at a first end and adapted to couple to the fishing tackle box at a second end, wherein the first adjustable joint is coupled to the second end.

The adjustable member desirably further includes a second member having a first end adapted to form a first adjustable joint coupled to the second end of the first member and having a second end adapted form a second adjustable joint coupled to a bottom of the fishing tackle box, the first and second adjustable joints including a releasable locking capability for locking the adjustable member and fishing tackle box in a desired configuration.

The fishing tackle system adapted to a fishing boat desirably but not essentially includes a removable tray adapted to individually contain fishing lures in compartments integral to the removable tray.

Also contemplated is a fishing tackle system adapted to attach to a seat bottom. The fishing tackle system includes a fishing tackle box and a member coupling the fishing tackle box to the seat bottom. The member includes a first member adapted to be secured to the boat seat at a first end and adapted to couple to the fishing tackle box at a second end and a first adjustable joint coupled to the second end. The member further includes a second member having a first end adapted to form the first adjustable joint coupled to the second end of the first member and having a second end of adapted form a second adjustable joint coupled to a bottom of the fishing tackle box. The first and second adjustable joints include a releasable locking capability for locking the adjustable member and fishing tackle box in a desired configuration relative to the seat.

The first member desirably but not essentially comprises first channel stock having a first length and a first width and including raised portions disposed along the first length at first and second edges of the first channel stock and substantially disposed on the first side thereof. The raised portions define a first channel extending along the first length on the first side of the first member.

The second member desirably but not essentially comprises second channel stock having a second length and a second width and including raised portions disposed along the second length at first and second edges of the second channel stock and substantially disposed on the first side thereof. The raised portions define a second channel extending along the second length on the first side of the second member. The second channel is smaller than the first channel such that the second width nests within the first channel.

The first member desirably but not essentially includes a longitudinal slot disposed substantially along the first length and at the second end of the first member. The longitudinal slot allows increased range of adjustment of the first and second members relative to one another.

BRIEF DESCRIPTION OF THE DRAWINGS

The foregoing and further and more specific objects, features and advantages of the instant invention will become readily apparent to those skilled in the art from the following detailed description of preferred embodiments thereof taken in conjunction with the drawings in which:

FIG. 3 depicts a side view of a first embodiment of an adjustable attachment for the fishing tackle system of FIGS. 1 and 2, illustrating the attachment to the seat and a tackle box;

FIG. 5 provides a further enlarged partial bottom view of the first embodiment of an adjustable attachment and fishing tackle box illustrating articulation of the adjustable attachment of FIGS. 1 through 4;

FIG. 6 presents a sketch showing a plan view of the fishing tackle box of FIGS. 1 through 3 and 5 with the lid thereof illustrated in partial cutaway view, showing a preferred arrangement of the internal compartments thereof and depicting a removable tackle box section;

FIG. 7 is an isometric sketch depicting the fishing tackle box of FIGS. 1 through 3, 5 and 6, illustrating placement of the removable tackle box section in the fishing tackle box;

DETAILED DESCRIPTION OF THE PREFERRED EMBODIMENT

Figure 1:
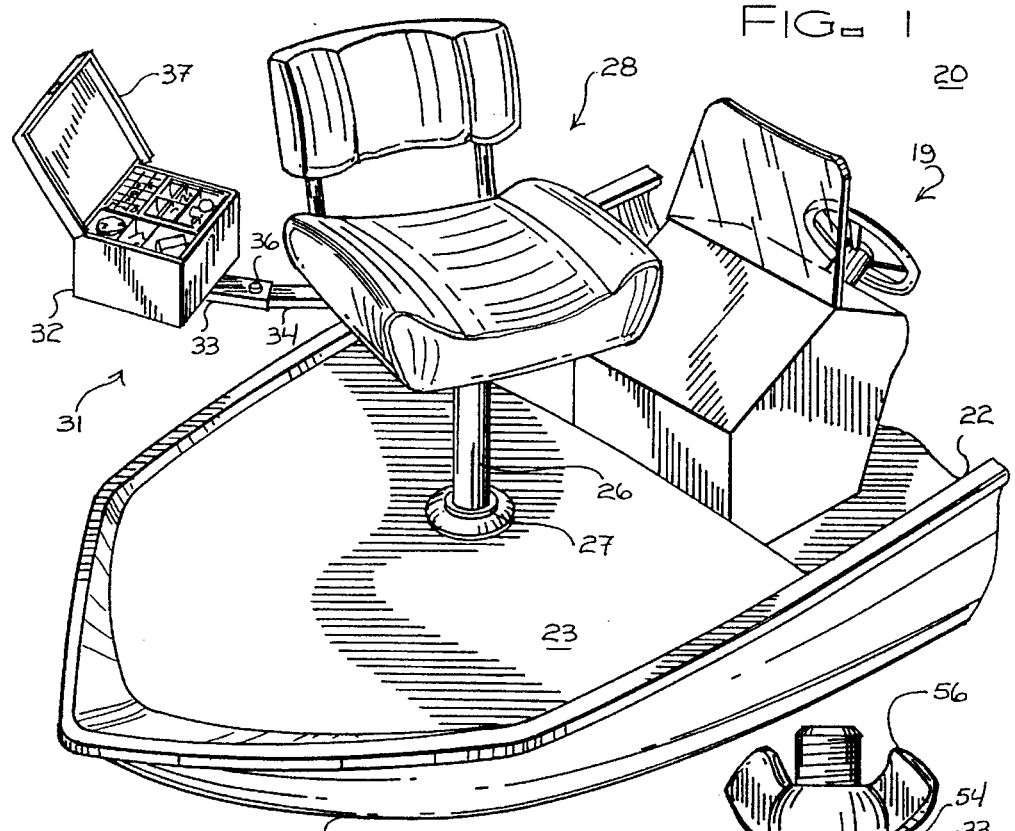
FIG. 1 is a sketch of a fishing boat having an adjustable seat equipped with a fishing tackle system, in accordance with the teachings of the instant invention.

Turning now to the drawings, in which like reference characters indicate corresponding elements throughout the several views, attention is first directed to FIG. 1, in which a fishing boat 19 and a fishing tackle system 31 in accordance with the teachings of the instant invention are illustrated and are generally designated by the reference character 20. In accordance with the configuration chosen for purposes of illustration and clarity, FIGS. 1 through 5 collectively depict a first embodiment of the fishing tackle system 31 in variously detailed views, showing many of the advantageous features and objects thereof.

FIG. 1 is a sketch of a fishing boat 19 having an adjustable seat 28 equipped with a fishing tackle system 31, in accordance with the teachings of the instant invention. The fishing tackle system 31 includes a fishing tackle box bottom 32 which is detachably coupled to the seat 28. In fishing boats 19, the seats 28 are frequently detachably mounted to the deck 23 via a post 26 that mates or nests in a receptacle 27 installed in the deck 23. This arrangement allows the seat 28 to rotate through the normal range an angler may want to cast over or fish through, typically about two hundred degrees.

It is frequently inconvenient and undesirable to try to access a conventional fishing tackle box (not illustrated) placed on the deck 23, especially if the conventional fishing tackle box (not illustrated) was set down at one extreme of the angler's normal range of motion and is desired at the other extreme at a later time. It is further inconvenient to place the conventional fishing tackle box (not illustrated) in the middle of the angler's normal range of motion because the conventional fishing tackle box (not illustrated) is then an obstacle to be negotiated in changing position. Infrequently, the fisherman may trip over the conventional fishing tackle box (not illustrated) and fall, or accidentally kick the conventional fishing tackle box (not illustrated), overboard in response to hooking a particularly large fish or in the ordinary course of addressing other distractions. While such events are uncommon, they are undesirable because they are substantially inconvenient, extremely embarrassing and also because they are very unlikely to be forgotten by the angler's companions.

The fishing tackle system 31 of the instant invention avoids these problems by coupling a fishing tackle box 32 to the seat 28. In the embodiment illustrated in FIG. 1, this coupling is effected through a pair of members 33 and 34 adjustably coupled together via a first adjustable joint 36. The fishing tackle box 32 rotates with the seat 28 and so is always to hand. Further, when the seat is raised to provide a clearer view into the water and for improved casting range and access thereto, the fishing tackle box 32 automatically tracks this motion. Because the fishing tackle box 32 is securely mounted, the contents cannot be disarrayed or become scattered and/or lost by accidentally kicking the fishing tackle box 32 or otherwise inadvertently disturbing it or knocking it over.

Figure 2:
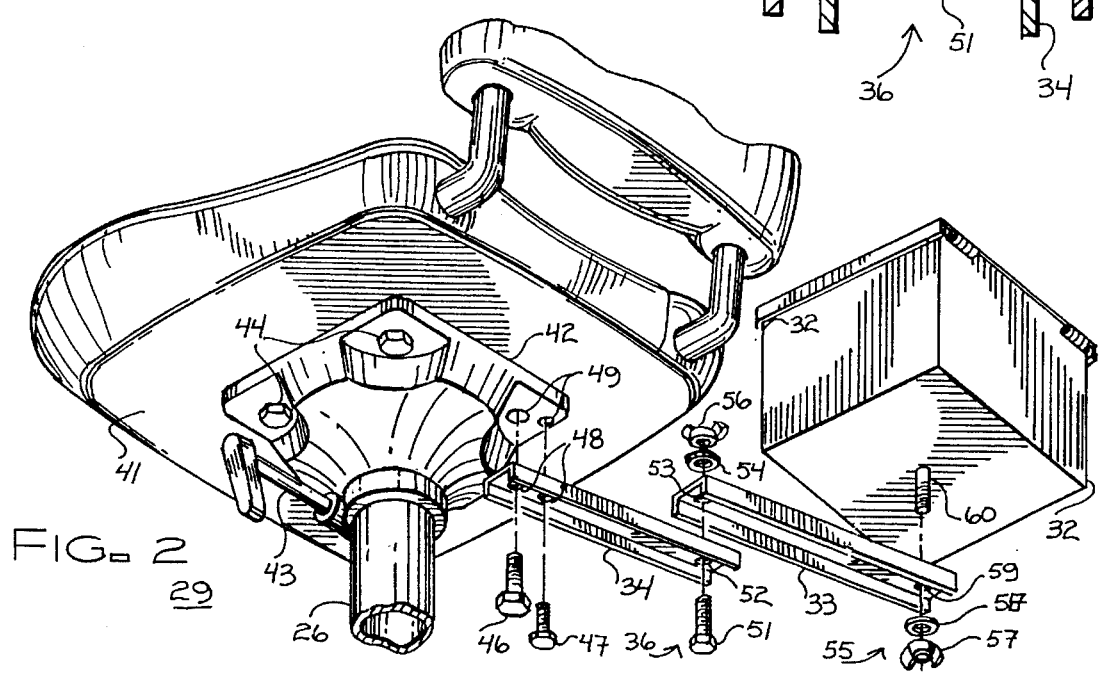
FIG. 2 is a partially exploded isometric sketch of the bottom of the seat and fishing tackle system of FIG. 1, illustrating attachment of the fishing tackle system to the seat bottom.

Attention is now drawn to FIG. 2, showing a partially exploded isometric sketch of the bottom 41 of the seat 28 and the fishing tackle system 31 of FIG. 1 and illustrating the attachment of the fishing tackle system 31 to the seat bottom 41. The seat 28 is typically securely coupled to the post 26 by a seat mount 42. The seat mount 42 is bolted to the seat bottom 41 by a group of bolts 44. The heighth of the seat 28 is adjusted when desired by way of the seat adjustment lever 43. This first embodiment of the present invention has a first member 34 secured by the bolts 44 and 46 passing through the holes 48 in a first end of the first member 34 and threaded into the openings 49 in the seat mount 42.

A second end of the first member 34 is coupled to a first end of the second member 33 by a first adjustable joint 36. In the embodiment depicted in FIG. 2, the adjustable joint 36 comprises a bolt 51 that passes through a first hole 52 in the second end of the first member 34 and a second hole 53 in the first end of the second member 33. The bolt 51 is usefully held in place by the combination of a lockwasher 54 and a wing nut 56. Either or both of the holes 52 and 53 is usefully a slot-shaped hole 52 and/or 53, desirably having a long axis of the slot-shaped hole 52 or 53 that is substantially aligned with a long axis of the member(s) 33 and/or 34. This arrangement provides a greater range of adjustable positions for the fishing tackle box 32 when the wing nut 56 is loosened.

The second end of the second member 33 is desirably coupled to the fishing tackle box 32 through a second adjustable joint 55. In the embodiment illustrated in FIG. 2, the second adjustable joint 55 is effected via a bolt 60 extending from the bottom of the fishing tackle box 32. The bolt 60 passes through a hole 59 located in a second end of the second member 33 and is desirably secured thereto by the combination of a lockwasher 58 and a wing nut 57.

Turning now to FIG. 3, a side view of a first embodiment of an adjustable attachment 35 for the fishing tackle system 31 of FIGS. 1 and 2 is depicted, illustrating the attachment thereof to the seat 28 and a fishing tackle box 32. The arrangement illustrated in assembled form in FIG. 3 maintains the fishing tackle box 32 in fixed relation to the seat 28 when this is desired and also enables ready and easy adjustment of this fixed relation when adjustment of this type is desired.

Figure 4:
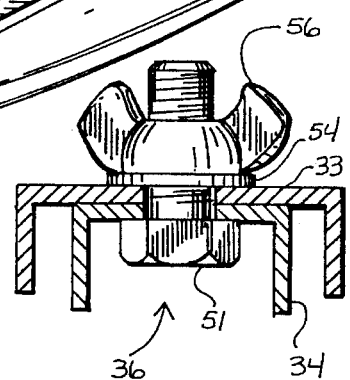
FIG. 4 illustrates a detailed and enlarged side view, in section, taken along section lines 4—4 of FIG. 3, of a first embodiment of an adjustable attachment including a wing nut and lateral mounting for the fishing tackle system of FIGS. 1 through 3.

With reference now to FIG. 4, a detailed and enlarged side view, in section, taken along section lines 4—4 of FIG. 3, of a first embodiment of an adjustable attachment 36 including the wing nut 56 and effecting lateral mounting for the fishing tackle system 31 of FIGS. 1 through 3 is illustrated. FIG. 4 shows that the channels of the first 34 and the second 33 members are preferably of different sizes. When the adjustable fastener 36 is loosened, a greater range of relative motion is afforded to the first member 34 with respect to the second member 33, as may be more readily appreciated by addressing the contents of FIG. 5 and the associated text.

Referring now to FIG. 5, a further enlarged partial bottom view of the first embodiment of an adjustable attachment 35 and fishing tackle box 32 illustrating articulation of the adjustable attachment 35 of FIGS. 1 through 4 is provided. When the first adjustable joint 36 is loosened, the second member 33 may be adjusted at least over the range of motion indicated by direction arrow 38. Similarly, when the second adjustable joint 55 is loosened, the position of the fishing tackle box 32 on the second end of the second member 33 may be adjusted over the range suggested by direction arrows 39. Tightening the first 36 and the second 55 adjustable joints after adjustment provides a semi-permanent, individualized "fit" for the fishing tackle box 32 relative to the seat 28 and the angler to suit the desires of the person who is fishing from the seat 28.

Figure 8:
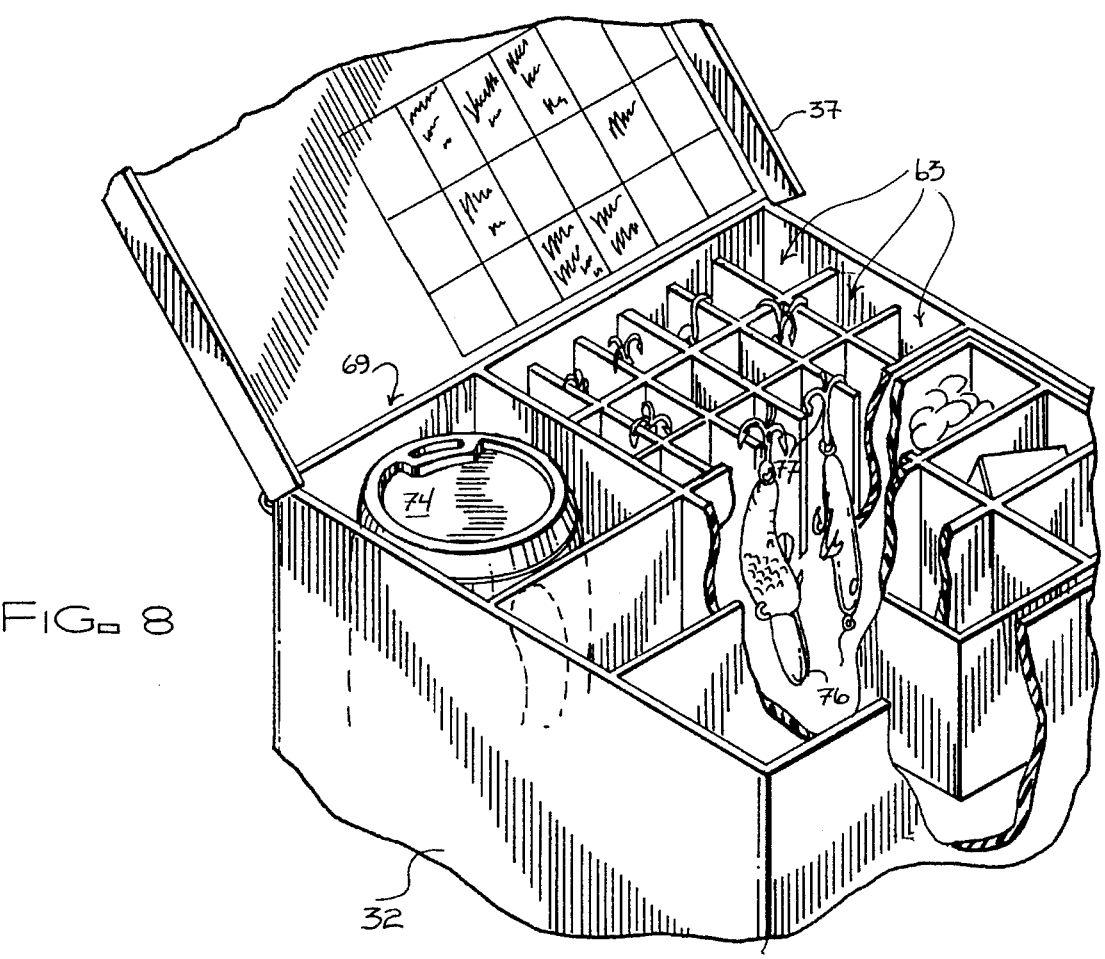
FIG. 8 depicts an isometric sketch showing a partially cutaway view of the interior of the fishing tackle box of FIGS. 1 through 3 and 5 through 7, illustrating a beverage receptacle therefor.

FIGS. 6 through 8 collectively depict desirable features usefully provided with the fishing tackle box 32 of the present invention.

Attention now is directed to FIG. 6, presenting a sketch showing a plan view of the fishing tackle box 32 of FIGS. 1 through 3 and 5 with the lid 37 thereof illustrated in partial cutaway view, showing a preferred arrangement of the internal compartments thereof and depicting a removable tackle box section 64. Small compartments 63, large fixed compartments 67 and 68 and intermediately sized compartments 66 contained within the removable portion 64 are illustrated, however, it will be appreciated that the relative sizes and the number of compartments may be independently altered without significant departure from the key, core concepts of the instant invention.

Also illustrated in FIG. 6 is an opening 69 usefully adapted to accommodate a beverage container 74 (e.g., a can of beer, soda or other beverage—see FIG. 8). Beverage containers 74 (see FIG. 8) are often desired on fishing trips for a variety of significant reasons. However, the beverage containers 74 (see FIG. 8) can provide substantial nuisance value if they are placed on the deck 23 (see FIG. 1) in accordance with at least all of the reasons noted hereinabove. One solution to this problem has been to place the beverage containers 74 (see FIG. 8) in receptacles that are hung by beverage holders from the gunwales 22 (see FIG. 1). This has the disadvantage of placing the beverage container 74 (see FIG. 8) at an inconvenient distance from the angler and also risks startling or spooking of the fish if noise is generated in retrieving and/or replacing the beverage container 74 (see FIG. 8).

Placing a secure beverage mounting receptacle 69 in a fixed relation to the angler obviates all of these nuisances and abets fishing by reducing the number of opportunities for spooking the fish. Removing storage of the beverage container 74 (see FIG. 8) from the deck 23 or gunwales 22 (see FIG. 1) of the fishing boat is generally an advantageous feature.

Reference is now made to FIG. 7, providing an isometric sketch of the fishing tackle box 32 of FIGS. 1 through 3, 5 and 6, illustrating placement of the removable tackle box section 64 in the fishing tackle box 32.

A group of removable tackle box sections 64 may be employed by the angler, with each one of the group stocked for a particular species of fish (e.g., bass, crappie, walleye, perch etc.), a specific body of water or a given season. The group of removable sections 64 may be stored in a centralized compartment in the boat 19 (see FIG. 1) or elsewhere (i.e., at home or in the garage).

More generalized gear (e.g., needle-nosed pliers, sunscreen, hook disgorger etc.) useful for all types of fishing may be maintained in the larger fixed compartments (see the compartments 67 and 68 in FIG. 6, supra). This arrangement greatly increases the utility of the fishing tackle box 32 while incurring little attendant incremental added expense.

Also illustrated in FIG. 7 is an eye 72 adapted to mate with a hasp 73. By engaging the hasp 73 with the eye 72 and then locking or securely fastening shut the fishing tackle box 32, security against the undesired influences of marauders (e.g., raccoons etc.) likely to be attracted to and meddle with, remove and/or lose fishing gear is provided. This arrangement also provides improved security for the contents of the fishing tackle box 32 for highway travel or when the boat is moving at speed and/or in rough water.

Attention is now directed to FIG. 8, depicting an isometric sketch showing a partially cutaway view of the interior of the fishing tackle box 32 of FIGS. 1 through 3 and 5 through 7 and illustrating a beverage receptacle 69 therefor. The small compartments 63 accommodate a variety of lures 76 usefully suspended by hooking the associated treble hooks 77 over the edges of the small compartments 63.

This arrangement places the treble or otherwise hooks 77 in a predetermined relationship to the fishing tackle box 32, allowing the angler to extract a lure 76 by feel (rather than sight) with reduced risk of being hooked and prevents lures from becoming tangled with one another. This arrangement also reduces the risk of the angler's being hooked when retrieving the beverage container 74 from the beverage container receptacle 69.

Figure 10:
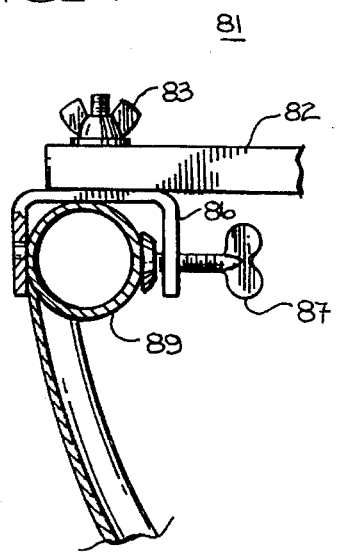
FIG. 10 shows an enlarged side view, in section, of a portion of the alternative mounting configuration of FIG. 9, illustrating the gunwale and attachment of the fishing system of the instant invention thereto.
Figure 9:
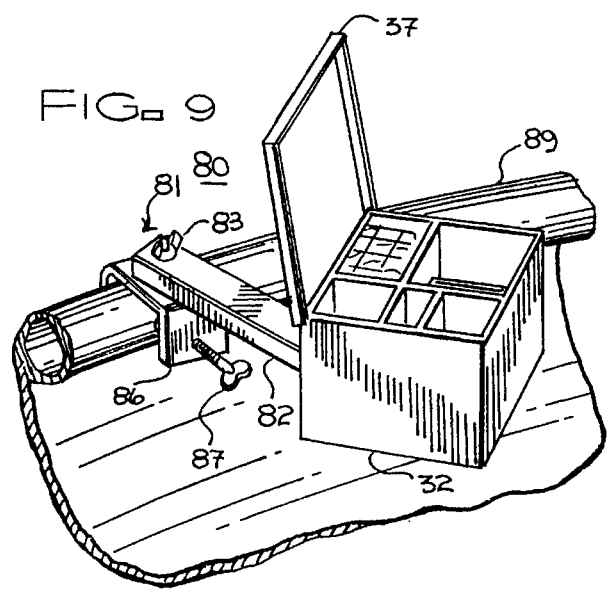
FIG. 9 shows an isometric view of a portion of a boat having a gunwale and including an alternative mounting configuration for a fishing tackle system analogous to that of FIGS. 1 through 8.

FIGS. 9 and 10 collectively illustrate an alternative embodiment 80 of the fishing tackle system 31 of FIGS. 1 through 8 in accordance with the present invention. The alternative embodiment 80 is adapted to couple to the gunwale 89 of a fishing boat.

Referring now to FIG. 9, which provides an isometric view of a portion of a boat having a gunwale 89 and including an alternative mounting configuration for a fishing tackle system 80 analogous to that of FIGS. 1 through 8. The fishing tackle system 80 includes a fishing tackle box 32 and lid 37 coupled to the gunwale 89 of a boat such as a rowboat, johnboat or canoe. The fishing tackle box 32 is adjustably coupled to the gunwale 89 via a member 82, an adjustable first joint 83 and an adjustable clamp comprising a bracket 86 and a thumbscrew 87.

Attention is now drawn to FIG. 10, showing an enlarged side view, in section, of a portion 81 of the alternative mounting configuration 80 of FIG. 9, illustrating the gunwale 89 and attachment of the fishing system of the instant invention thereto. The thumbscrew 87 allows the bracket 86 to be securely attached to any portion of the gunwale 89 as desired. The adjustable joint 83 allows the angle that the member 82 makes with the gunwale 89 to be adjusted as required. The adjustable joint 83 also permits this desired adjustment to be then fixed by tightening the adjustable joint 83, realized in the instant embodiment as a wing nut arrangement.

The embodiment of FIGS. 9 and 10 is particularly useful in those types of boats that do not incorporated adjustable seats and may also be adapted to be secured to a lawnchair, pier or other object associated with a particular fishing environment. This embodiment removes the fishing tackle box 32 and a beverage container 74 (see FIG. 8) from harm's way and places both at the ready disposal of the angler in a position and at an attitude of the angler's choice.

It will be appreciated that other arrangements, including but not limited to those shown, for example, may be made for securing a fishing tackle box to a boat or a seat on a boat. For example, a different method of securing the fishing tackle box 32 to the seat 28 could allow the fishing tackle box 32 to be stowed beneath the seat 28 for trailering of the boat 19 (see FIG. 1) or for high speed travel across a body of water.

It will be appreciated that other physical arrangements of these components are possible without compromise of the functionality thereof and that the specific embodiment may include, for example, more or fewer compartments and removable components and may accommodate additional functions as well.

The apparatus described herein thus provides an improved fishing tackle box for use in the context of fishing from a boat. This apparatus also provides a beverage holder substantially as described herein and illustrated in the accompanying drawings.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A fishing tackle system adapted to a fishing boat, said fishing tackle system comprising:

a fishing tackle box;

a first member having a first end adapted to be secured to a boat seat and having a second end;

a second member having a first end coupled to said second end of said first member forming a first adjustable joint for lateral movement of said second member, and a second end coupled to said fishing tackle box forming a second adjustable joint for lateral movement of said fishing tackle box, said first adjustable joint and said second adjustable joint each include a releasable locking capability for locking the second member and fishing tackle box in a desired configuration and said first adjustable joint including a first bolt, said first bolt extending through said second end of said first member from a first side thereof, a first lockwasher disposed about said first bolt on a second side of said first member, and a first adjustable nut securing said first lockwasher to said first bolt.

2. The fishing tackle system adapted to a fishing boat as claimed in claim 1, wherein said first adjustable nut comprises a first wing nut.

3. The fishing tackle system adapted to a fishing boat as claimed in claim 1, wherein said second adjustable joint comprises:

a second bolt, said second bolt extending through said second end of said second member from a first side thereof;

a second lockwasher disposed about said second bolt on a second side of said second member; and a second adjustable nut securing said second lockwasher to said second bolt.

4. The fishing tackle system adapted to a fishing boat as claimed in claim 3, wherein said second adjustable nut comprises a wing nut.

5. A fishing tackle system adapted to attach to a seat bottom comprising:

a fishing tackle box;

a first member adapted to be secured to and remain stationary in relation to said seat bottom at a first end and having a second end, said first member comprises first channel stock having a first length and a first width and including raised portions disposed along said first length at first and second edges of said first channel stock and substantially disposed on said first side thereof, said raised portions defining a first channel extending along said first length on said first side of said first member;

a second member having a first end coupled to said first member forming a first adjustable joint for lateral movement of said second member, and a second end coupled to said fishing tackle box forming a second adjustable joint for lateral movement of said fishing tackle box, said second member, including a second channel stock having a second length and a second width and including raised portions disposed along said second length at first and second edges of said second channel stock and substantially disposed on said first side thereof, said raised portions defining a second channel extending along said second length on said first side of said second member, wherein said second channel is smaller than said first channel such that said second width nests within said first channel, said first adjustable joint and said second adjustable joint each include a releasable locking capability for locking the second member and fishing tackle box in a desired configuration; and a longitudinal slot disposed substantially along said first length and at said second end of said first member, said longitudinal slot for allowing increased range of adjustment of said first and second members relative to one another.

6. A fishing tackle system adapted to a fishing boat, said fishing tackle system comprising:

a fishing tackle box;

a first member having a first end adapted to be secured to a boat seat and having a second end, said first member comprises first channel stock having a first length and a first width and including raised portions disposed along said first length at first and second edges of said first channel stock and substantially disposed on said first side thereof, said raised portions defining a first channel extending along said first length on said first side of said first member;

a second member having a first end coupled to said second end of said first member forming a first adjustable joint for lateral movement of said second member, and a second end coupled to said fishing tackle box forming a second adjustable joint for lateral movement of said fishing tackle box, said second member comprises second channel stock having a second length and a second width and including raised portions disposed along said second length at first and second edges of said second channel stock and substantially disposed on said first side thereof, said raised portions defining a second channel extending along said second length on said first side of said second member, wherein said second channel is smaller than said first channel such that said second width nests within said first channel, said first adjustable joint and said second adjustable joint each include a releasable locking capability for locking the second member and fishing tackle box in a desired configuration; and a longitudinal slot disposed substantially along said first length proximate said second end of said first member, said longitudinal slot for allowing increased range of adjustment of said first and second members relative to one another.

* * * * *